US005838299A

United States Patent [19]

Smith et al.

[11] Patent Number: 5,838,299

[45] Date of Patent: Nov. 17, 1998

[54] RGB/YUV VIDEO CONVOLUTION SYSTEM

[75] Inventors: R. Steven Smith; Laurence A. Thompson, both of Saratoga, Calif.

[73] Assignee: Apple Computer, Inc., Cupertino, Calif.

[21] Appl. No.: 433,096

[22] Filed: May 3, 1995

[51] Int. Cl.[6] ................................ G09G 5/36; H04N 9/77

[52] U.S. Cl. .......................... 345/137; 345/138; 345/154; 348/660; 348/664; 382/279

[58] Field of Search ..................................... 345/137, 150, 345/153, 154; 382/162, 167, 278, 279; 348/138, 234, 237, 660, 661, 663, 664; 358/518, 515, 516; H04N 9/77

[56] References Cited

U.S. PATENT DOCUMENTS

| | | | |
|---|---|---|---|
| 4,843,457 | 6/1989 | Yamagata | 358/31 |
| 5,005,011 | 4/1991 | Perlman et al. . | |
| 5,012,333 | 4/1991 | Lee et al. | 358/80 |
| 5,119,444 | 6/1992 | Nishihara | 382/45 |
| 5,247,366 | 9/1993 | Ginosar et al. | 358/209 |
| 5,450,500 | 9/1995 | Brett | 382/162 |
| 5,457,477 | 10/1995 | Wang et al. | 345/150 |
| 5,477,335 | 12/1995 | Tai | 358/298 |
| 5,546,105 | 8/1996 | Leak | 345/155 |

*Primary Examiner*—Wendy Garber
*Assistant Examiner*—Ngoc-Yen Vu
*Attorney, Agent, or Firm*—Burns, Doane, Swecker & Mathis, L.L.P.

[57] ABSTRACT

An apparatus and a method are provided for smoothing out high frequency information in an interlaced computer generated display. A computer generated RGB signal is converted into a YUV signal, which is separated into its Y, U, and V components. The Y component is convolved by averaging a current scan line with a line above and a line below the current scan line so that black lines are lightened and white lines are darkened, thus avoiding flicker. Since convolution is only performed on the Y part of the YUV signal, only two line buffers, each having a width equal to the number of bits in the Y component only, are required.

20 Claims, 2 Drawing Sheets

RGB/YUV VIDEO CONVOLUTION SYSTEM

This invention relates to a method and an apparatus for filtering computer generated video signals for an interlaced display. More particularly, this invention relates to a method and an apparatus for vertically filtering computer generated video signals through a convolution process for display on a CRT display.

BACKGROUND

Some types of cathode ray tube (CRT) computer displays are designed to be compatible with standard television signals. These types of displays operate with an interlaced raster scan. Thus, personal computers which utilize these types of displays must generate pixel data for use in interlaced, raster-scanned format.

Computer generated data is less suited for interlaced, raster-scanned display than a video signal from a video camera or other type of video signal source. Computer generated pixel data can exhibit changes in amplitude over an entire range from pixel to pixel, and virtually any change can occur from one pixel to the next. In contrast, video data from a source such as a camera uses a beam spot which encompasses more than a single pixel area, so that data for a single pixel takes into account to some extent the intensity and color of the surrounding area. In a video source such as a camera, there is a softening that occurs as the beam scans the image.

When video data from a camera or the like is displayed on an interlaced display, there are no abrupt transitions from one scan line to the next. Objects generally do not have sharply defined edges, and those that do usually do not have edges lined up with a scan line. As a result, a viewer's eye cannot find an edge between scan lines and cannot distinguish between them. Interlaced lines that are individually flashing at 1/30th of a second appear to be flashing at 1/60th of a second, since at each 1/60th of a second either a given scan line or the next scan line is refreshed. Thus, video data from a camera appears to be continuous without flicker.

In a computer generated image, there can be abrupt amplitude transitions at virtually every place where there is not a solid white or black line. If these transitions take place in the vertical direction, it is easy for the viewer's eye to detect the edge from one scan line to next, and the scan lines are seen individually, flashing at 1/30th of a second. Thus, the displayed image flickers noticeably enough to be distracting.

Numerous techniques have been employed for removing flicker in a computer generated video display. In some cases, filters duplicate the softening effects of the camera beam by averaging or convolving pixels to produced filtered pixel data. U.S. Pat. No. 5,005,011, for example, discloses a system which performs vertical filtering by convolution. In such a system, the convolution process averages the vertical scan lines of the video data, so that the transition between dark and light lines is softened. Through the convolution process, black lines are lightened by adjacent lighter lines, and white lines are darkened by adjacent darker lines. The convolved result consists of lines with less sharply defined contrasts.

In conventional computer display systems, computer generated video data is processed into pixel data presented in terms of its red, green, and blue (RGB) components, and the RGB data is convolved, and then converted into luminance-chrominance (YUV) form for presentation to the video monitor. Since each RGB component contains information that pertains to the relative darkness or lightness of a pixel, each component is involved in the convolution process. More particularly, the red, green, and blue component values of each pixel which is involved in the convolution process must be stored in a memory. The convolution process requires sufficient hardware and/or computing power to separately convolve each of the red, green, and blue components for each pixel that is involved in the process.

SUMMARY

It is an object of the present invention to reduce the memory requirements in a system to remove flicker in an interlaced computer display, and to do so with uncomplicated hardware.

According to one aspect of the invention, a computer generated video signal is converted into a luminance-chrominance (YUV) signal before convolution. The YUV signal is separated into its Y, U, and V components. Since only the luminance (Y) component contributes to flicker, only the Y component needs to be convolved to remove flicker. The Y component is input into a convolver, and a convolution process is performed. The Y component is vertically filtered by averaging the scan lines through the convolution process, to reduce flicker. Then, the Y, U, and V components are encoded into a signal suitable for display on a CRT display. Since conversion to the YUV format is typically part of the processing of a computer generated video signal for display on an interlaced display, performing convolution on the Y component does not require any additional hardware. Since only the Y component is convolved, only one third of the buffer memory is required relative to that which would be required to convolve the R, G, and B components. This reduces the amount of hardware needed, thus reducing costs.

DETAILED DESCRIPTION OF THE PREFERRED EMBODIMENTS

The present invention avoids flicker in a computer generated video signal displayed on a CRT display by preprocessing the computer data before display. In the following embodiment, red-green-blue (RGB) data is used as an illustrative example of computer generated video data that is preprocessed before display. The invention is not limited to RGB data, however, but applies to any format of computer generated video data. Those skilled in the art will appreciate that the video data can be totally generated by a computer or generated by combining video data from a non-computer source (for example, video tape) and a computer source.

Figure 1:
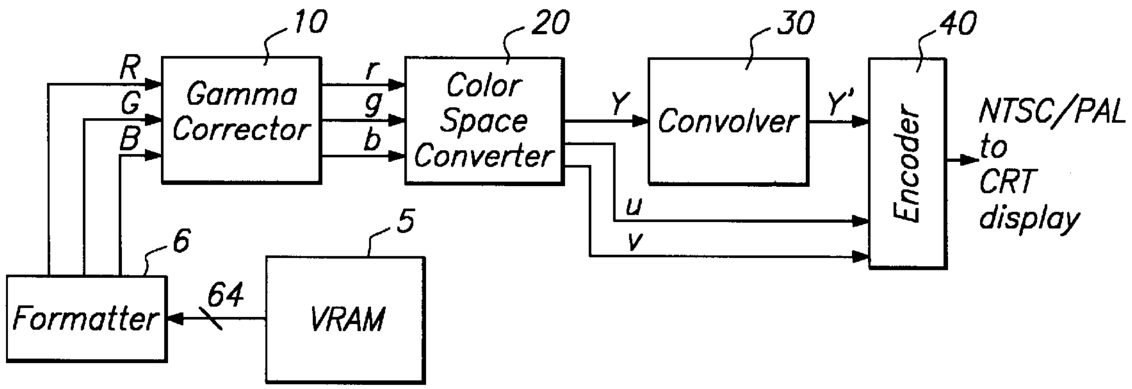
FIG. 1 illustrates a data processing system employing the present invention.

FIG. 1 illustrates a data processing system which preprocesses computer generated video data for display. Referring to FIG. 1, computer generated RGB data is first retrieved from a VRAM 5 in a computer. The VRAM stores video data to be processed for display on a CRT. The video data is latched from the VRAM into a formatter 6 for conversion into RGB pixel data. A 64 bit RAM can be used as the VRAM 5, and the video data can be latched to the formatter 6 on a 64 bit data bus.

The formatter 6 converts the latched video data into RGB pixel data consisting of, for example, 8, 16, or 32 bits per pixel. The RGB pixel data consists of, for example, 24 bits, with 8 bits each for the red, green, and blue components.

Formatted RGB data is gamma corrected in a gamma corrector 10. Gamma correction is carried out to compensate for the non-linear light intensity curve of the CRT display. The gamma corrector 10 acts as a non-linear multiplier. The gamma corrector 10 can, for example, be a triple 256×8 RAM with an 8 bit input and an 8 bit output. For an 8 bit system, the RGB values can be limited to the CCIR 601 standard range of 16 to 253. If the RGB values are not limited to the range 16 to 235, a usable composite video signal will be produced, but it can contain voltage levels that exceed the standard levels, resulting in "blacker than black" or "whiter than white" levels. The output of the gamma corrector is an rgb signal consisting of, for example, 24 bits.

The gamma corrected output RGB is delivered from the gamma corrector 10 to a color space converter 20 for conversion to equivalent YUV values. Color space conversion is performed according to the following equations:

$$Y=(77/256)*r+(150/256)*g+(29/256)*b$$

$$U=(b-Y)*(148/256)+(128/256)$$

$$V=(r-Y)*(189/256)+(128/256)$$

A 24 bit rgb signal, for example, is converted by the color space converter 20 according to the formula above to the equivalent YUV values consisting of 24 bits, with 8 bits each for the Y, U, and V components.

After conversion to the YUV format, the Y, U, and V components are separated, and the Y component is input into a convolver 30. In the convolver 30 the Y lines are vertically filtered by averaging the Y lines. The convolved output Y' consists of averaged scan lines, with less sharply defined luminance contrasts. A convolved output Y' is encoded along with the U and V components by encoder 40 into an NTSC signal, a PAL signal, or any other analog signal suitable for display on a CRT display.

Figure 2:
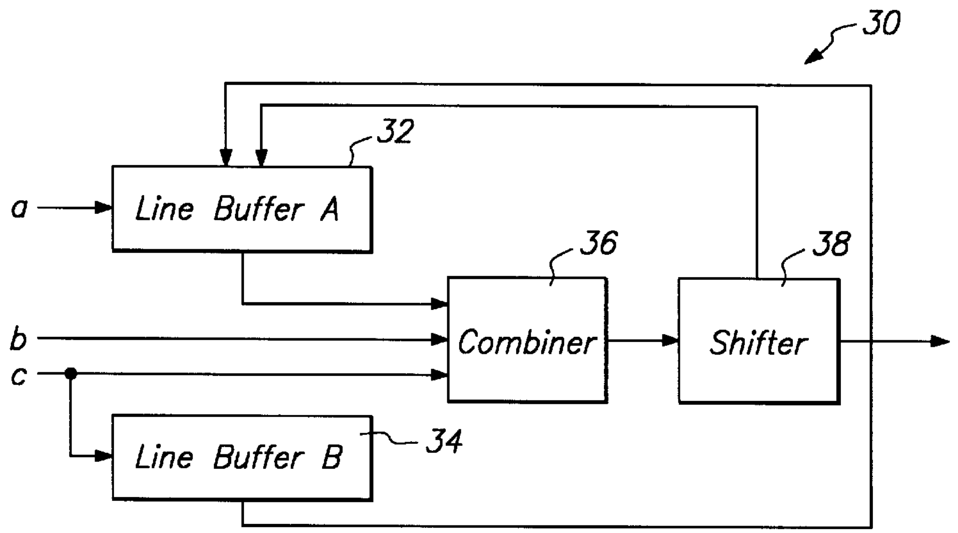
FIG. 2 illustrates a convolution system according to the present invention.

FIG. 2 illustrates in detail a convolution system according to the present invention. In the convolution system depicted in FIG. 2, the Y component consists of several lines, but for illustrative purposes, only five lines will be considered, the lines designated as a–e. Referring to FIG. 2, the convolution system according to the present invention includes two internal line buffers, 32 and 34. The line buffers may, for example, be 768×8 line buffers.

The line buffers store alternate lines for combination in the combiner 36. The combiner 36 combines input lines to produce a combined output, and the shifter 38 performs a divide-by-two operation on the combined output. For example, two 8 bit inputs can be combined in the combiner 36 to produce a 9 bit combined output. The 9 bit combined output can be divided by two in the shifter 38 by shifting the 8 most significant bits of the combined output by one bit position, to eliminate the least significant bit.

Figure 3A:
FIGS. 3*a*–3*f* illustrate a convolution process according to the present invention.
Figure 3B:
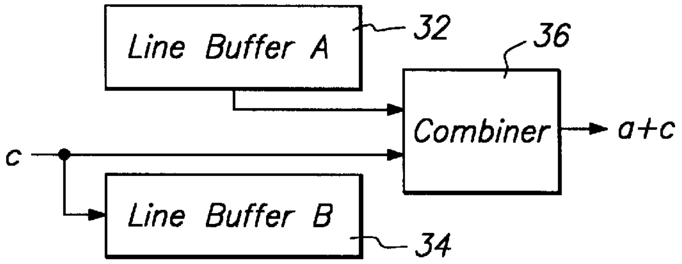

FIGS. 3*a*–3*f* illustrate in detail a convolution process according to the present invention. Referring to FIGS. 3*a*–3*f*, convolution is performed in several steps. As depicted in FIG. 3*a*, the line a above the current line of interest b is initially stored in a line buffer A designated by numeral 32. Next, as shown in FIG. 3*b*, the line c below the current line b is stored in a line buffer B designated by numeral 34. The line a is output from the line buffer A and combined with the line c in the combiner 36 to produce a combined output a+c. Storage of the line c in the line buffer B can be performed at the same time as the combination of the line c with the line a in the combiner 36.

Figure 3C:
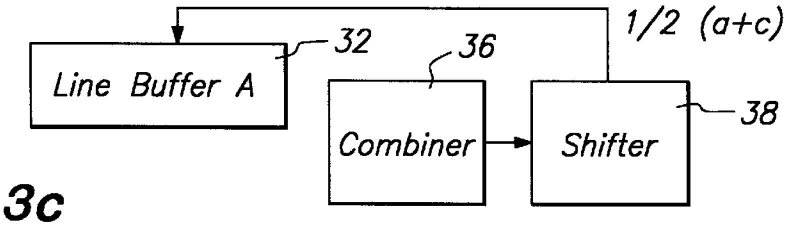
Figure 3D:
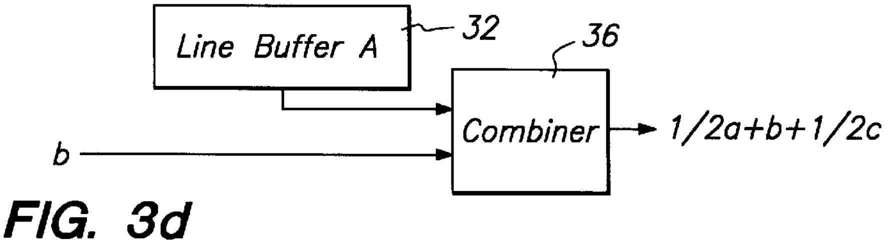
Figure 3E:
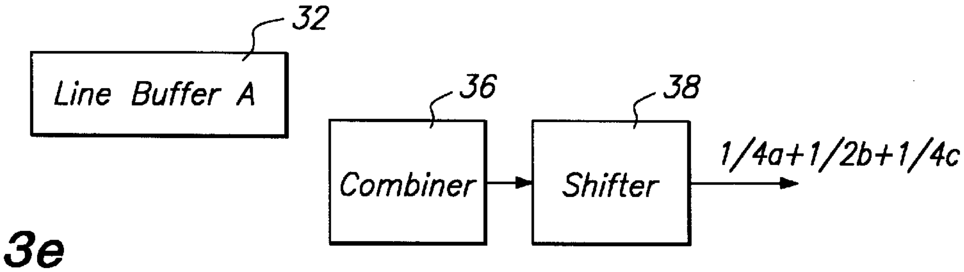

Referring to FIG. 3*c*, the combined output a+c is divided by two in the shifter 38, and the resulting value ½(a+c) is stored in the line buffer A. Then, referring to FIG. 3*d*, a current line b is combined with the output of the line buffer A in the combiner 36 to produce a combined output ½a+b+½c. As shown in FIG. 3*e*, the combined output ½a+b+½c is divided by two in the shifter 38, and the resulting value ¼a+½b+¼c is output as an averaged line for display.

Figure 3F:
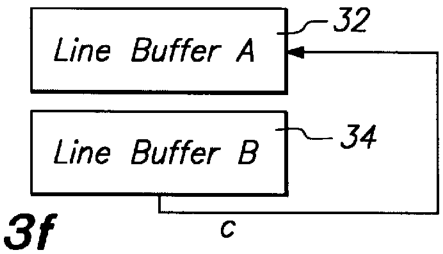

Finally, referring to FIG. 3*f*, the line c that is stored in the line buffer B is output and stored in the line buffer A. The line c then becomes the line above the next current line d, and the process shown in FIGS. 3*a*–3*f* is repeated with lines c–e, etc., for all the lines of the Y component. In this way, the Y component is vertically filtered to avoid flicker.

According to the present invention, flicker can be avoided by vertically filtering the Y component with a convolver. Since only the Y component is convolved, only two line buffers, each having a width equal to the number of bits in the Y component only, are required. For example, by convolving only the Y component of a 24 bit signal YUV signal formed from a 24 bit RGB signal, 8 bit wide buffers can be used in the convolver, instead of 24 bit wide buffers that would be required to convolve the R, G, and B components. This reduces the amount of memory needed, thus reducing costs. Furthermore, the actual convolution process can be carried out with a minimal amount of hardware, namely two line buffers, one combiner, and one shifter, thereby further reducing costs.

While a particular embodiment of the invention has been described and illustrated, it should be understood that the invention is not limited thereto and further contemplates any and all modifications that fall within the spirit and scope of the invention as defined by the following claims.

What is claimed is:

1. A method for producing an interlaced display of computer generated data including the steps of:

generating video data of n bits;

converting the video data of n bits into luminance-chrominance (YUV) data of n bits;

separating the YUV data into Y, U, and V components of m bits each;

convolving the Y component; and displaying the convolved Y component and the U and V components, wherein the Y component contains several scan lines, and the step of convolving is performed according to the formula:

¼a+½b+¼c wherein b is a current scan line of the Y component, a is a scan line immediately above the current scan line, and c is a scan line immediately below the current scan line.

2. A method for producing an interlaced display of computer generated data including the steps of:

generating video data of n bits;

converting the video data of n bits into luminance-chrominance (YUV) data of n bits;

separating the YUV data into Y, U, and V components of m bits each;

convolving only the Y component; and displaying the convolved Y component and the unconvolved U and V components, wherein the Y component contains several scan lines, and the step of convolving includes the steps:

a) storing a first scan line above a current scan line in a first line buffer;

b) storing a second scan line below the current scan line in a second line buffer and combining the second scan line with the stored first scan line to produce a first combination;

c) dividing the first combination and storing the divided first combination in the first line buffer;

d) combining the current scan line with the divided first combination to produce a second combination; and e) dividing the second combination to produce an averaged scan line for display.

3. The method of claim 2, wherein the step of convolving further includes, after step e), the steps:

f) moving the second scan line from the second line buffer to the first line buffer, wherein the second scan line becomes a scan line above a next current scan line; and g) repeating steps a) through e) for all the scan lines of the Y component.

4. The method of claim 2, wherein the first line buffer and the second line buffer are each 8 bits wide.

5. The method of claim 2, wherein said step of generating further includes the step of:

combining video data from a non-computer source and a computer source.

6. The method of claim 2, wherein the video data is red-green-blue (RGB) video data.

7. The method of claim 2, further including the step of gamma correcting the video data before said converting step.

8. The method of claim 2, wherein n=24 bits and m=8 bits.

9. The method of claim 2, further including the step of encoding the convolved Y component and the unconvolved U and V components to a form suitable for display before the displaying step.

10. An apparatus for producing an interlace display of computer generated data including:

means for generating video data of n bits;

converting means for converting the video data of n bits into luminance-chrominance (YUV) data of n bits;

separating means for separating the YUV data into Y, U, and V components of m bits each;

convolving means for convolving only the Y component; and means for displaying the convolved Y component and the unconvolved U and V components, wherein the Y component contains several scan lines, and the convolving means convolves according to the formula:

$$\frac{1}{4}a+\frac{1}{2}b+\frac{1}{4}c$$

wherein b is a current line scan line of the Y component, a is a scan line immediately above the current scan line, and c is a scan line immediately below the current scan line.

11. An apparatus for producing an interlaced display of computer generated data including:

means for generating video data of n bits;

converting means for converting the video data of n bits into luminance-chrominance (YUV) data of n bits;

separating means for separating the YUV data into Y, U, and V components of m bits each;

convolving means for convolving only the Y component; and means for displaying the convolved Y component and the unconvolved U and V components, wherein the Y component contains several scan lines, and the convolving means comprises:

a first line buffer;

a second line buffer;

a combiner; and a shifter for dividing an output from the combiner, wherein the first line buffer, the second line buffer, the combiner, and the shifter perform the following process;

the first line buffer stores a first scan line above a current scan line, the second line buffer stores a second scan line below the current scan line, the combiner combines the first scan line stored in the first line buffer with the second scan line to produce a first combination, the shifter divides the first combination, the first line buffer stores the divided first combination, the combiner combines the current scan line with the divided first combination stored in the first line buffer to produce a second combination, and the shifter divides the second combination and outputs the divided second combination as an averaged scan line for display.

12. The apparatus of claim 11, wherein after the divided second combination is output for display, the second scan line is moved from the second line buffer to the first line buffer and becomes a scan line above a next current scan line, and the process is repeated by the first line buffer, the second line buffer, the combiner, and the shifter for all the scan lines of the Y component.

13. The apparatus of claim 11, wherein the first line buffer and the second line buffer are each 8 bits wide.

14. The apparatus of claim 11, wherein said means for generating combines video data from a non-computer source and a computer source.

15. The apparatus of claim 11, wherein the video data is red-green-blue (RGB) video data.

16. The apparatus of claim 11, further comprising gamma correcting means for gamma correcting the video data before converting by the converting means.

17. The apparatus of claim 11, wherein n=24 bits and m=8 bits.

18. The apparatus of claim 11, further comprising encoding means for encoding the convolved Y component and the unconvolved U and V components to a form suitable for display before displaying by the displaying means.

19. An apparatus for convolving video data for display, comprising:

a first line buffer for storing a first scan line;

a second line buffer for storing a second scan line;

a combiner for combining the first scan line with the second scan line to form a first combination and for combining the first combination with a current scan line to form a second combination; and a shifter for dividing the first combination prior to combining by the combiner to form the second combination and for dividing the second combination to provide a convolved output for display.

20. A method for convolving video data for display, comprising the steps of:

storing a first scan line;

storing a second scan line;

combining the first scan line with the second line to form a first combination;

dividing the first combination;

combining the divided first combination with a current scan line to form a second combination; and dividing the second combination to provide a convolved output for display.

* * * * *